(12) United States Patent
Mendoza et al.

(10) Patent No.: US 7,698,597 B2
(45) Date of Patent: Apr. 13, 2010

(54) METHOD OF ISOLATING ERRONEOUS SOFTWARE PROGRAM COMPONENTS

(75) Inventors: Alfredo V. Mendoza, Georgetown, TX (US); Stephen Bailey Peckham, Austin, TX (US); Clifford Jay Spinac, Austin, TX (US); Tiffany Lynn Winman, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 11/364,650

(22) Filed: Feb. 28, 2006

(65) Prior Publication Data
US 2007/0220348 A1    Sep. 20, 2007

(51) Int. Cl.
*G06F 11/00* (2006.01)
(52) U.S. Cl. .......................................... 714/35; 714/38
(58) Field of Classification Search .................. 714/35, 714/38
See application file for complete search history.

(56) References Cited

U.S. PATENT DOCUMENTS

| | | | | |
|---|---|---|---|---|
| 4,683,532 A * | 7/1987 | Yount et al. | ........... | 714/38 |
| 4,736,289 A * | 4/1988 | Eaton | ........... | 712/229 |
| 4,831,517 A * | 5/1989 | Crouse et al. | ........... | 714/8 |
| 5,737,516 A * | 4/1998 | Circello et al. | ........... | 714/38 |
| 6,079,015 A * | 6/2000 | Harwood et al. | ........... | 712/244 |
| 6,182,243 B1 * | 1/2001 | Berthe et al. | ........... | 714/38 |
| 6,199,181 B1 * | 3/2001 | Rechef et al. | ........... | 714/38 |
| 6,356,960 B1 * | 3/2002 | Jones et al. | ........... | 710/5 |
| 6,418,542 B1 * | 7/2002 | Yeager | ........... | 714/38 |
| 6,430,703 B1 * | 8/2002 | Connor et al. | ........... | 714/20 |
| 6,658,591 B1 * | 12/2003 | Arndt | ........... | 714/6 |
| 6,735,770 B1 * | 5/2004 | Yeager et al. | ........... | 718/107 |
| 6,792,460 B2 * | 9/2004 | Oulu et al. | ........... | 709/224 |
| 6,836,855 B2 * | 12/2004 | Arndt | ........... | 714/9 |
| 6,848,097 B1 * | 1/2005 | Alverson et al. | ........... | 717/124 |
| 6,889,167 B2 * | 5/2005 | Curry, III | ........... | 702/183 |
| 6,959,262 B2 * | 10/2005 | Curry, III | ........... | 702/183 |
| 7,039,833 B2 * | 5/2006 | Knuutila et al. | ........... | 714/38 |
| 7,103,913 B2 * | 9/2006 | Arnold et al. | ........... | 726/22 |
| 7,134,050 B2 * | 11/2006 | Wenzel | ........... | 714/38 |
| 7,181,652 B2 * | 2/2007 | Shortz | ........... | 714/38 |
| 7,191,364 B2 * | 3/2007 | Hudson et al. | ........... | 714/38 |
| 7,243,267 B2 * | 7/2007 | Klemm et al. | ........... | 714/38 |
| 7,269,610 B2 * | 9/2007 | Choudhary et al. | ........... | 707/202 |
| 7,296,189 B2 * | 11/2007 | Day et al. | ........... | 714/38 |
| 7,308,610 B2 * | 12/2007 | Kuramkote et al. | ........... | 714/38 |
| 7,340,650 B2 * | 3/2008 | Westmacott | ........... | 714/38 |
| 7,340,651 B2 * | 3/2008 | Coldicott et al. | ........... | 714/38 |
| 7,353,428 B2 * | 4/2008 | Cheston et al. | ........... | 714/38 |
| 7,370,360 B2 * | 5/2008 | van der Made | ........... | 726/24 |
| 7,398,429 B2 * | 7/2008 | Shaffer et al. | ........... | 714/45 |
| 2003/0159086 A1 * | 8/2003 | Arndt | ........... | 714/25 |
| 2003/0177411 A1 * | 9/2003 | Dinker et al. | ........... | 714/13 |

(Continued)

*Primary Examiner*—Robert Beausoliel
*Assistant Examiner*—Joshua P Lottich
(74) *Attorney, Agent, or Firm*—Yee & Associates, P.C.; Libby Z. Toub (57) ABSTRACT

A computer implemented method, computer program product, and computer usable program code for preventing execution of program components having errors. First, a software application is executed. The software application interacts with a number of programs. Next, an error message is received. The error message indicates an error has occurred in a first program within the number of programs. The first program is then isolated such that the first program no longer interacts with the software application.

15 Claims, 6 Drawing Sheets

U.S. PATENT DOCUMENTS

| | | | |
|---|---|---|---|
| 2004/0078689 A1* | 4/2004 | Knuutila et al. | 714/38 |
| 2004/0133821 A1* | 7/2004 | Shortz | 714/38 |
| 2004/0172219 A1* | 9/2004 | Curry, III | 702/186 |
| 2004/0172221 A1* | 9/2004 | Curry, III | 702/186 |
| 2004/0268202 A1* | 12/2004 | Haswell et al. | 714/752 |
| 2005/0015672 A1* | 1/2005 | Yamada | 714/38 |
| 2005/0034024 A1* | 2/2005 | Alverson et al. | 714/38 |
| 2005/0066233 A1* | 3/2005 | Day et al. | 714/38 |
| 2005/0120273 A1* | 6/2005 | Hudson et al. | 714/38 |
| 2005/0172162 A1* | 8/2005 | Takahashi et al. | 714/4 |
| 2005/0257093 A1* | 11/2005 | Johnson et al. | 714/38 |
| 2006/0048106 A1* | 3/2006 | Citron et al. | 717/136 |
| 2006/0130076 A1* | 6/2006 | Stern | 719/331 |
| 2006/0143536 A1* | 6/2006 | Grey | 714/38 |
| 2006/0288420 A1* | 12/2006 | Mantripragada et al. | 726/25 |
| 2007/0022133 A1* | 1/2007 | Barghouthi | 707/102 |
| 2007/0038897 A1* | 2/2007 | Lainer | 714/38 |
| 2007/0168742 A1* | 7/2007 | Wadsworth et al. | 714/38 |
| 2007/0174715 A1* | 7/2007 | Kilian | 714/38 |
| 2007/0185935 A1* | 8/2007 | Olivieri et al. | 707/204 |
| 2008/0222333 A1* | 9/2008 | Barry et al. | 710/260 |

* cited by examiner

METHOD OF ISOLATING ERRONEOUS SOFTWARE PROGRAM COMPONENTS

BACKGROUND OF THE INVENTION

1. Field of the Invention

The present invention relates generally to an improved data processing system and in particular to handling errors that occur in computer software. Still more particularly, the present invention relates to a computer implemented method, computer program product, and computer usable program code for isolating erroneous software components.

2. Description of the Related Art

Modern software is often very complex and can involve a large number of lines of code. If printed onto paper, a single program can possibly be thousands of pages long. To address this problem, software engineers often design software programs in modular form. The modules are then put together and programmed to interact with each other to accomplish a desired purpose. The process of combining modules in this way is analogous to constructing a building in that pre-fabricated components are brought to the construction site and combined in a desired manner. In the same sense that building design can be referred to as building architecture, the design of how software modules are combined can be referred to as software architecture.

However, even software architecture can become exceedingly complex. Furthermore, if a problem or error arises in one software module, then that problem or error can propagate to other software modules or otherwise affect other software modules. Additionally, the error can propagate to or affect a main program, application server, or other software designed to coordinate modules in a software architecture. Whether or not the error propagates to or affects such coordination software or only modules within a software architecture, the error in one module can cause the entire architecture to fail, operate in an undesirable manner, or otherwise be subject to additional errors.

SUMMARY OF THE INVENTION

The present invention provides for a computer implemented method, computer program product, and computer usable program code for preventing execution of program components having errors. First, a software application is executed. The software application interacts with a number of programs. Next, an error message is received. The error message indicates an error has occurred in a first program within the number of programs. The first program is then isolated such that the first program no longer interacts with the software application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
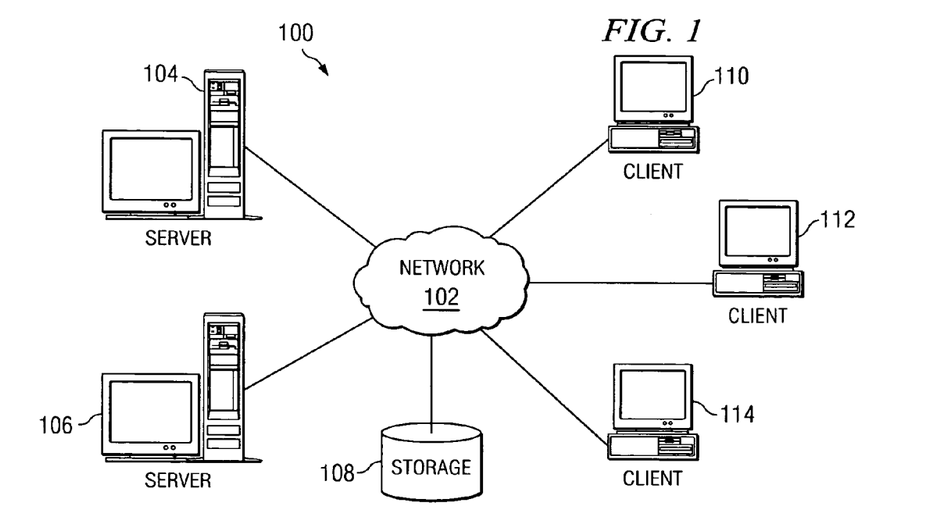
FIG. 1 shows a data processing system in which the aspects of the present invention may be implemented.
Figure 2:
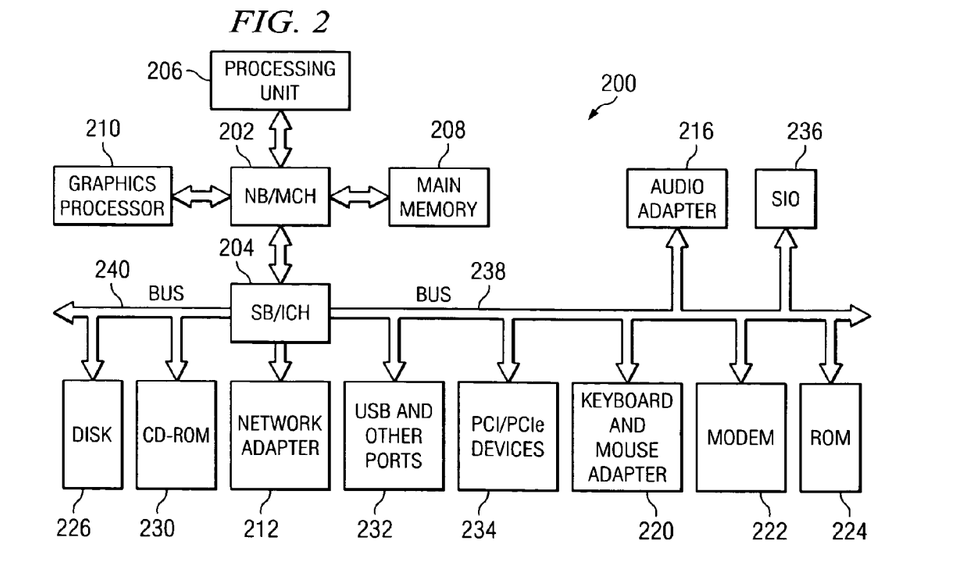
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The mechanisms and methods of the present invention provides for a computer implemented method, computer program product, and computer usable program code for preventing execution of program components having errors. First, a software application is executed. The software application interacts with a number of programs. Next, an error message is received. The error message indicates an error has occurred in a first program within the number of programs. The first program is then isolated such that the first program no longer interacts with the software application.

Thus, the mechanisms and methods of the present invention allow a server application to isolate service applications that are experiencing errors from other software applications that normally interact with the service applications experiencing errors. Similarly, the mechanisms and methods of the present invention allow modules, routines, or sub-programs within a larger software application to be isolated from the larger software application. Thus, the remaining service applications can continue operation in conjunction with the server application. Similarly, a larger software application can continue running without the affected modules, routines, or sub-programs. Other, unaffected, modules, routines, or sub-programs can also continue running.

Figure 3:
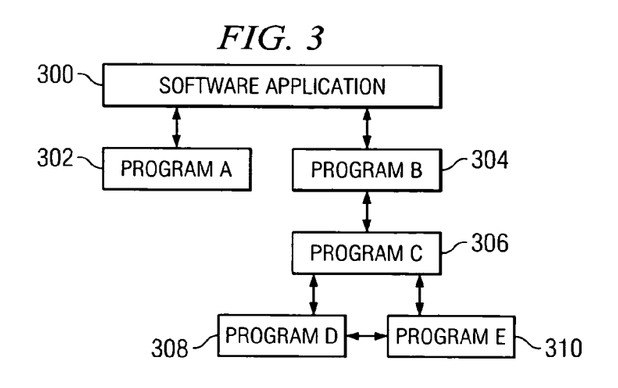
FIG. 3 is a block diagram of how a software application can interact with a number of programs, in accordance with an illustrative example of the present invention.

FIG. 3 is a block diagram of how a software application can interact with a number of programs, in accordance with an illustrative example of the present invention. Software application 300, program A 302, program B 304, program C 306, program D 308, and program E 310 are sets of instructions that can be executed on a data processing system, such as clients 110, 112, and 114 in FIG. 1; servers 104 and 106 in FIG. 1; and data processing system 200 shown in FIG. 2.

Software application 300 and programs A through E (302 through 310) can operate on separate data processing systems, communicating via a network, such as network 102 in FIG. 1. The software architecture shown in FIG. 3 can include more or less programs or software applications that interact in a manner more frequent or different than that shown in FIG. 3.

Software application 300 is a set of instructions in a computer usable medium. The term "software application" also means a set of instructions executable by a computer or other data processing system. Software application 300 is designed to perform some desired action, such as but not limited to transfer data, analyze data, modify data, or configure hardware. Software application 300 interacts with a number of other programs, such as program A 302, program B 304, program C 306, program D 308, and program E 310. A "program" is a set of instructions, stored in a computer usable medium, and executable by a computer or other data processing system. The term "program" includes, but is not limited to, a set of sub-instructions within the context of a larger software architecture. Each program is designed to perform some desired action, such as but not limited to the actions listed above.

In addition, each program interacts in some manner with software application 300. Program A 302 and program B 304 interact directly with software application 300. Program C 306, program D 308, and program E 310 interact indirectly with software application 300 because each of these programs only interact with software application 300 via another program. For example, program C 306 interacts with program B 304. Program D 308 and program E 310 interact with each other and with program C 306.

A first program is said to interact with a second program if the first program in some way communicates with the second program. For example, a first program can call a second program to perform a calculation. The second program performs the calculation and returns the result to the first program. Programs can interact with each other in any number of ways.

Together, software application 300, program A 302, program B 304, program C 306, program D 308, and program E 310 form a software architecture. A software architecture is an abstract, conceptual design of a software application or a program, or an abstract, conceptual design of how one or more programs should interact with each other. A software architecture can be implemented by writing programs for execution in a computer or other data processing system.

When the software architecture shown in FIG. 3 has been implemented, errors can occur in one or more of software application 300, program A 302, program B 304, program C 306, program D 308, and program E 310. When an error occurs in a program or the application, the application or the program can crash. A program or application crashes when it no longer operates, or when it shuts down, hangs, or ceases operation. An error can also cause a software application or program to operate in a manner undesirable to the designer, software engineer, or end user.

In addition, an error in one program or application can cascade into other programs. The term "cascade" means that an error either propagates to another program or application, or otherwise causes some other error in another program or application. For example, an error in program A 302 can cascade into software application 300. An error in program C 306 can cascade into program D 308, program E 310, or program B 304. Furthermore, the error that began in program C 306 and cascaded into program B 304 can further cascade to software application 300 and, from there, even into program A 302. Thus, an error in one program can cascade into all other programs or applications in a software architecture. As a result, all programs in a software architecture can crash or experience errors.

However, isolation of a program or application can prevent an error from cascading. The term "isolation" means that a set of instructions is isolated from other software applications, main programs, programs, modules, or routines in a software architecture. Thus, the term "isolation" means that other software applications, main programs, programs, modules, or routines in a software architecture can not access or communicate with the isolated set of instructions. An isolated application, routine, program, or set of instructions can be said to be in an "error zone."

Thus, for example, if an error occurs in program E 310, and program E 310 is isolated, then the error in program E 310 likely will not cascade to the other programs or to software application 300. Often, software application 300 and program A 302, program B 304, program C 306, and program D 308 can continue running without the functionality provided by program E 310. In this case, users who do not use the functionality of program E 310 can continue using the implemented software architecture of software application 300, program A 302, program B 304, program C 306 and program D 308. Thus, software application 300 remains operational until program E 310 until the error is corrected, program E 310 is updated, or program E 310 is otherwise repaired or replaced. This process is described further with respect to FIG. 6.

Figure 4:
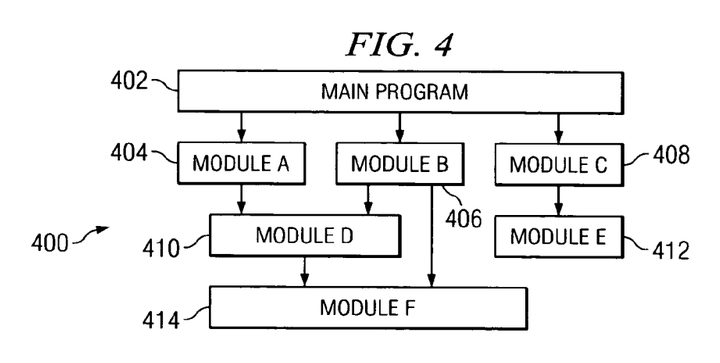
FIG. 4 is a block diagram of an architecture for a software application, in accordance with an illustrative example of the present invention.

FIG. 4 is a block diagram of an architecture for a software application, in accordance with an illustrative example of the present invention. Software architecture 400 shown in FIG. 4 is a more detailed example of a general software architecture, such as that shown in FIG. 3. Main program 402, module A 404, module B 406, module C 408, module D 410, module E 412, and module F 414 are sets of instructions that can be executed on a data processing system, such as clients 110, 112, and 114 in FIG. 1; servers 104 and 106 in FIG. 1; and data processing system 200 shown in FIG. 2. Main program 402 and modules A through E (404 through 414) can operate on separate data processing systems, communicating via a network, such as network 102 in FIG. 1. Software architecture 400 shown in FIG. 4 can include more or less modules or main programs that interact in a manner more frequent or different than that shown in FIG. 4.

Main program 402 is a set of instructions in a computer usable medium. The term "main program" also means a set of instructions executable by a computer or other data processing system. Main program 402 is designed to perform some desired action, such as but not limited to transfer data, analyze data, modify data, or configure hardware. Typically, main program 402 coordinates modules A through F (404 through 414).

Main program 402 interacts with a number of modules, such as module A 404, module B 406, module C 408, module D 410, module E 412, and module F 414. The terms "module" or "routine" mean a program, as defined with respect to FIG. 3. The terms "module" or "routine" include, but are not limited to, program components in a software architecture. The term "module" includes, but is not limited to, a set of sub-instructions within the context of a larger software architecture. Each module is designed to perform some desired action, such as but not limited to the actions listed above vis-à-vis FIG. 3.

In addition, each module interacts in some manner with main program 402. Module A 404, module B 406, and module C 408 interact directly with main program 402. Module D 410, module E 412, and module F 414 interact indirectly with main program 402 because each of these modules only interact with main program 402 via another module. For example, module D 410 interacts indirectly with main program 402 via module A 404 and module B 406. Module A 404 and module B 406 interact directly with module D 410. Similarly, module B 406 and module D 410 interact directly with module F 414, though module F 414 interacts indirectly with module A 404 and main program 402. Likewise, module E 412 interacts directly with module C 408 and indirectly with main program 402.

As with the software architecture shown in FIG. 3, an error arising in one module can cascade to the other modules and to main program 402. As a result, one, several, or all of the modules and main program 402 could crash or otherwise experience errors. To address this problem, one, several, or all of the modules and main program 402 can be isolated to prevent an error in one from cascading. An isolated module can be said to be in an "error zone."

If a module is isolated, then other modules can not use the functionality of the isolated module. Furthermore, isolation of one module can force other modules to become isolated. For example, if module D 410 is isolated, then module A 404 may no longer be able to interact indirectly with module F 414; however, depending on the functionality of main program 402, module A 404 could possibly interact indirectly with module F 414 via main program 402 and module B 406. In another illustrative example, if module C 408 were isolated, then module E would also be isolated from main program 402.

Nevertheless, in these illustrative examples, any modules that are not isolated can continue to run and interact with each other and with main program 402. Thus, users can continue to access the functionality of main program 402 and the remaining, non-isolated modules while the error is corrected or while the isolated modules are repaired, updated, or replaced. The process of performing isolation within a complex software architecture, such as the one shown in FIG. 4, is further described with respect to FIG. 7 and FIG. 9.

Figure 5:
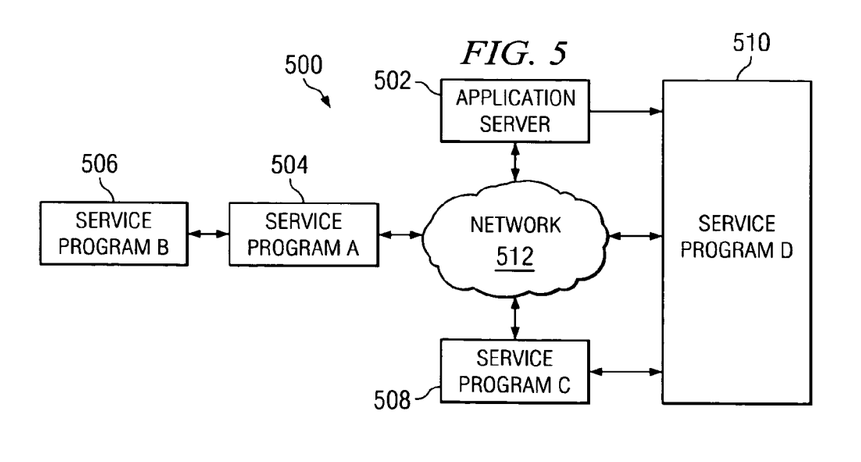
FIG. 5 is a block diagram of a number of service programs interacting with an application server, in accordance with an illustrative example of the present invention.

FIG. 5 is a block diagram of a number of service programs interacting with an application server, in accordance with an illustrative example of the present invention. Software architecture 500 shown in FIG. 5 is a more detailed example of a general software architecture, such as that shown in FIG. 3. Application server 502, service program A 504, service program B 506, service program C 508, and service program D 510 are sets of instructions that can be executed on one or more data processing system, such as clients 110, 112, and 114 in FIG. 1; servers 104 and 106 in FIG. 1; and data processing system 200 shown in FIG. 2. Application server 502 and service program A through D (504 through 510) can operate on separate data processing systems and communicating via network 512, which can be any network such as network 102 in FIG. 1. Software architecture 500 shown in FIG. 5 can include more or less service programs or application servers that interact in a manner more frequent or different than that shown in FIG. 5.

Software architecture 500 can also be referred to as network service 500. Network service 500 uses application server 502 to coordinate many disparate programs operating on different data processing systems and possibly different operating systems. Application server 502 coordinates the activities and actions of service program A 504, service program B 506, service program C 508, and service program D 510 via network 512. Service programs can also interact with each other directly. For example, service program C 508 interacts with service program D 510 directly. Service program C 508 also interacts with application server 502 and service program A 504 via network 512. Service programs can also interact with each other indirectly. For example, service program D 510 and service program C 508 can interact indirectly with service program B 506 via network 512 and service program A 504.

If network 512 is the Internet, then each of service programs A through D (504 through 510) can be referred to as Web service applications. In addition, application server 502 can be referred to as a Web application server 502. Web application server 502 can be, for example, an application such as WEBSPHERE APPLICATION SERVER® available from International Business Machines Corporation of Armonk, N.Y.

As with the software architecture shown in FIG. 3 and FIG. 4, an error arising in one service program can cascade to the other service program and to application server 502. As a result, one, several, or all of the service programs and application server 502 could crash or otherwise experience errors. To address this problem, one, several, or all of the service programs and application server 502 can be isolated to prevent an error in one from cascading. An isolated service program or application server can be said to be in an "error zone."

If a service program is isolated, then application server 502 and other service programs can not use the functionality of the isolated service program. Furthermore, isolation of one service program can force other service programs to become isolated. For example, if service program A 504 is isolated, then service programs B 506 may no longer be able to interact with application server 502; however, application server 502 can still interact with service program C 508 and service program D 510.

Nevertheless, in these illustrative examples, any service programs that are not isolated can continue to run and interact with each other and with application server 502. Thus, users can continue to access the functionality of application server 502 and the remaining, non-isolated service programs while the error is corrected or while the isolated service programs are repaired, updated, or replaced. The process of performing isolation within a complex software architecture, such as the one shown in FIG. 5, is further described with respect to FIG. 8 and FIG. 10.

Isolating a service program can also protect other service programs or application server 502 against attacks by malicious users, known as hackers. For example, if a hacker attempts to damage software architecture 500 via an entry through service program A 504, then service program A 504 can be isolated. When isolated, the hacker can no longer access application server 502, service program B 506, service program C 508, service program D 510, and network 512. Thus, the damage a hacker can cause can be limited and contained. In the meantime, application server 502 and the remaining service programs accessible via network 512 or application server 502 can continue to run until the malicious attack can be defeated and any damage repaired or otherwise corrected.

Figure 6:
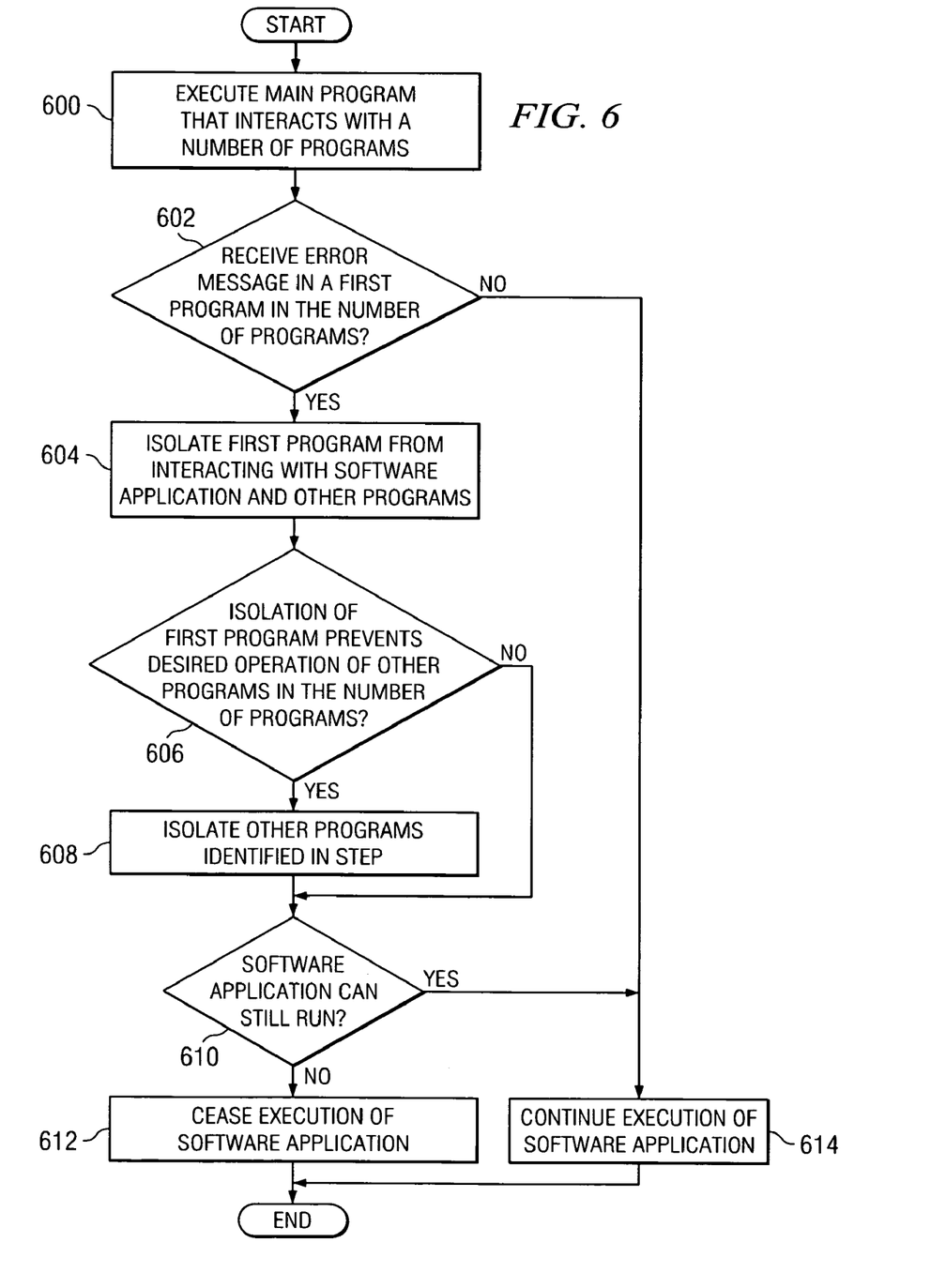
FIG. 6 is a flowchart illustrating alteration of relationships between a software application and a number of programs with which the software application interacts, in accordance with an illustrative example of the present invention.

FIG. 6 is a flowchart illustrating alteration of relationships between a software application and a number of programs with which the software application interacts, in accordance with an illustrative example of the present invention. The process shown in FIG. 6 is implemented in relation to the software architecture shown in FIG. 3. However, the process shown in FIG. 6 can be expanded, contracted, or modified to operate in conjunction with different software architectures, such as those shown in FIG. 4 and FIG. 5. The process shown in FIG. 6 can be implemented on a data processing system, such as clients 110, 112, and 114 in FIG. 1; servers 104 and 106 in FIG. 1; and data processing system 200 shown in FIG. 2. The process shown in FIG. 6 can be implemented using separate data processing systems communicating via a network, such as network 102 in FIG. 1.

As shown in FIG. 3, software application 300 interacts with a number of programs, such as program A 302, program B 304, program C 306, program D 308, and program E 310. Thus, software application 300 interacts with a number of programs.

Initially, software application 300 is executed (step 600). A determination is then made if software application 300 then receives an error message from a first program in the number of programs (step 602). If software application 300 does not receive an error message, then software application 300 and all related programs continue execution (step 614), with the process terminating thereafter. However, if software application 300 does receive an error message from the first program, then that first program is isolated from interacting with software application 300 and with the remaining programs in the software architecture (step 604). For example, program C 306 can send an error message to software application 300. In this case, program C 306 is isolated from software application 300 and program B 304. As a result, program D 308 and program E 310 are isolated from program B 304 and software application 300.

Next, a determination is made whether isolation of the first program prevents desired operation of other programs in the software architecture (step 606). If isolation of the first program does not prevent all desired operations of other programs in the software architecture, the process skips to step 610 for a further determination. However, if isolation of the first program does prevent operation of at least one other program in the software architecture, then all programs whose operation is affected by the isolation of the first program are also isolated (step 608).

For example, if program A 302 experiences an error, the program A 302 is isolated. Assuming that software application 300 can still run, then no other programs are isolated. However, if program C 306 is isolated, then program D 308 and program E 310 are also isolated.

A determination is then made whether software application 300 can still run (step 610). If software application 300 can not still run, then execution of software application 300 ceases (step 612). The process terminates thereafter. If, however, software application 300 can still run, then execution of software application 300 continues (step 614). Again, the process terminates thereafter.

Figure 7:
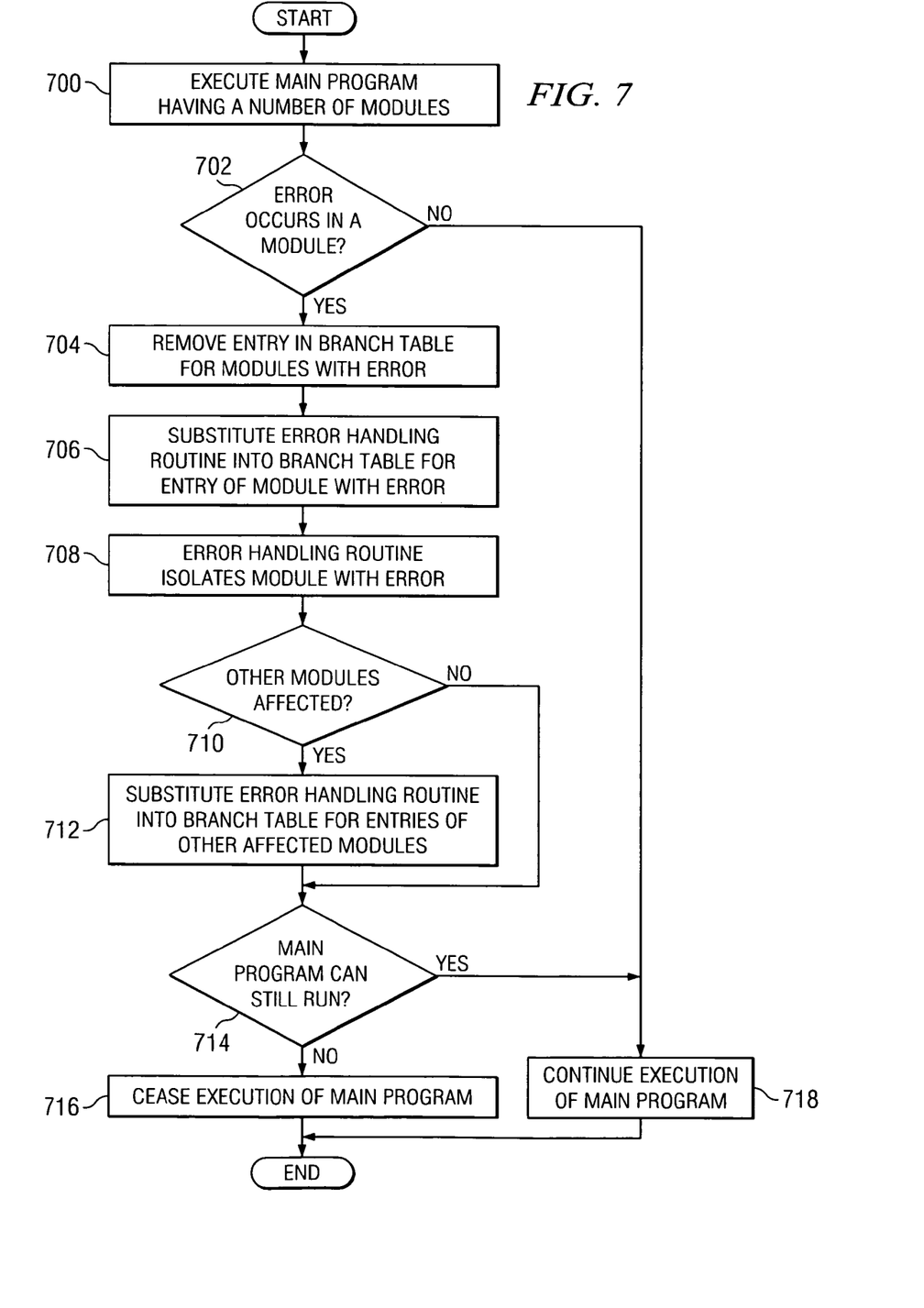
FIG. 7 is a flowchart illustrating alteration of relationships among modules in a software architecture, in accordance with an illustrative example of the present invention.

FIG. 7 is a flowchart illustrating alteration of relationships among modules in a software architecture, in accordance with an illustrative example of the present invention. The process shown in FIG. 7 is implemented in relation to software architecture 400 shown in FIG. 4. However, the process shown in FIG. 7 can be expanded, contracted, or modified to operate in conjunction with different software architectures, such as those shown in FIG. 3 and FIG. 5. The process shown in FIG. 7 can be implemented on a data processing system, such as clients 110, 112, and 114 in FIG. 1; servers 104 and 106 in FIG. 1; and data processing system 200 shown in FIG. 2. The process shown in FIG. 7 can be implemented using separate data processing systems communicating via a network, such as network 102 in FIG. 1. In an illustrative example, the process shown in FIG. 7 is implemented on a single data processing system. Thus, the process shown in FIG. 7 represents a specific implementation of the process shown in FIG. 6.

As shown in FIG. 4, software architecture 400 includes a main program 402 that coordinates and interacts with a number of modules, such as module A 404, module B 406, module C 408, module D 410, module E 412, and module F 414. Thus, main program 402 can be considered to have a number of modules. These modules and main program 402 interact with each other as described in relation to FIG. 4.

Initially, main program 402 is executed on a data processing system (step 700). A determination is made whether an error occurs in a module (step 702). If an error does not occur in a module, then execution of main program 402 continues (step 718). The process terminates thereafter.

However, if an error does occur in a module, then the entry in a branch table for the module with the error is removed (step 704). The creation and operation of a branch table is described with respect to FIG. 10. Thus, for example, if an error occurs in module C 408, then the entry for module C 408 in the branch table is removed. Subsequently, an error handling routine is substituted into the branch table for the entry of the component with the error (step 706). Continuing the example, if an error occurs in module C 408, then the now empty entry in the branch table is filled or substituted with an error handling routine. The operation of the error handling routine is described vis-à-vis FIG. 10. In turn, the error handling routine isolates the module having the error (step 708). A determination is then made whether other modules in software architecture 400 have been affected by the isolation of the module with the error (step 710). If no other modules have been affected, then the process skips to step 714 for further determination. However, if other modules have been affected, then those other modules are also isolated (step 712).

Next, a determination is made whether main program 702 can still run (step 714) after one or more modules have been isolated. If main program 702 can still run, then main program 702 continues execution (step 718). The process terminates thereafter. However, if main program 702 can not still run, then main program 702 ceases execution (step 716). Again, the process terminates thereafter.

Figure 8:
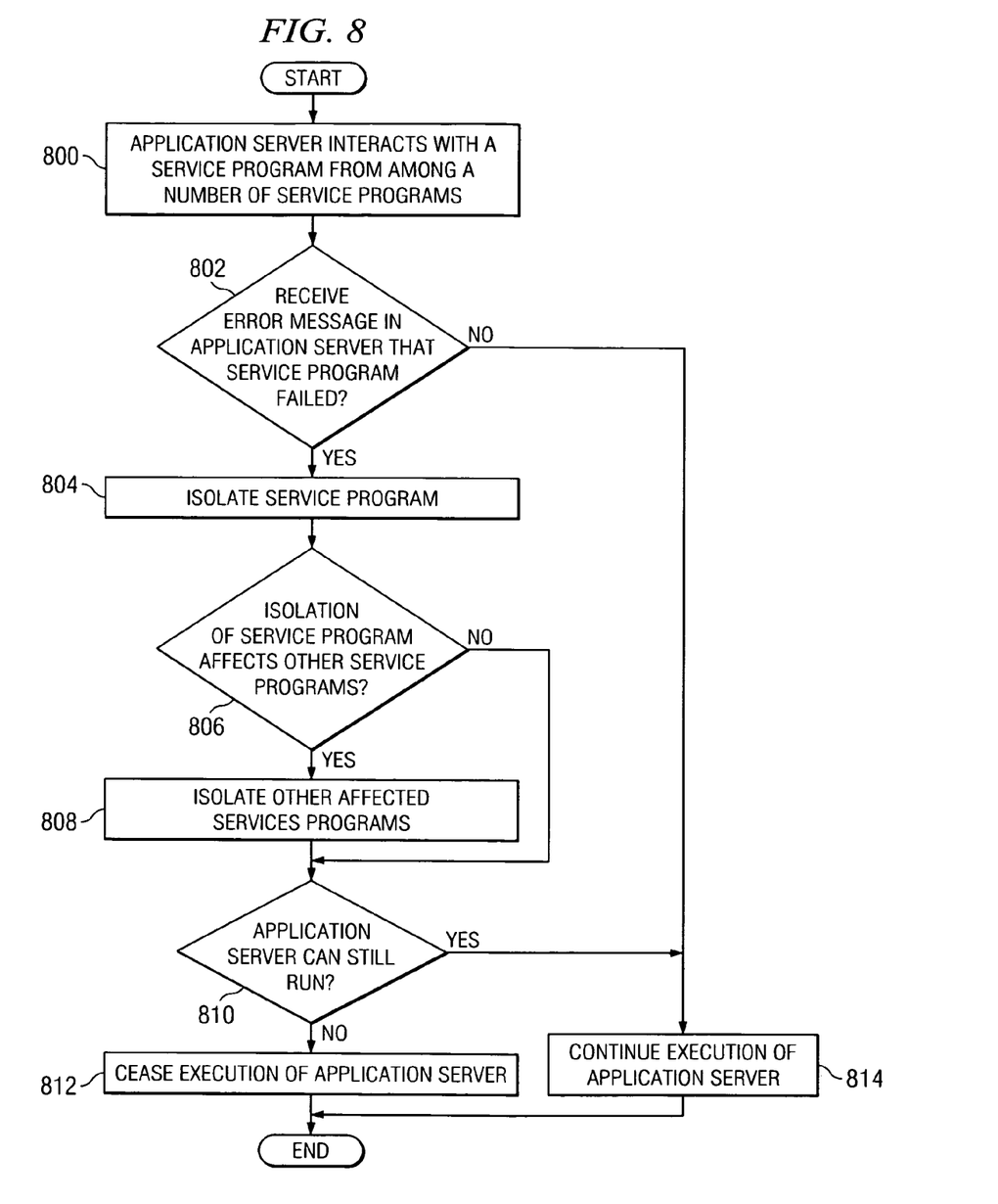
FIG. 8 is a flowchart illustrating alteration of relationships between an application server and a number of service programs with which the application server interacts, in accordance with an illustrative example of the present invention.

FIG. 8 is a flowchart illustrating alteration of relationships between an application server and a number of service programs with which the application server interacts, in accordance with an illustrative example of the present invention. The process shown in FIG. 8 is implemented in relation to software architecture 500 shown in FIG. 5. However, the process shown in FIG. 8 can be expanded, contracted, or modified to operate in conjunction with different software architectures, such as those shown in FIG. 3 and FIG. 4. The process shown in FIG. 8 can be implemented on a data processing system, such as clients 110, 112, and 114 in FIG. 1; servers 104 and 106 in FIG. 1; and data processing system 200 shown in FIG. 2. The process shown in FIG. 8 can be implemented using separate data processing systems communicating via a network, such as network 102 in FIG. 1. Thus, the process shown in FIG. 8 represents a specific implementation of the process shown in FIG. 6.

As described with respect to FIG. 5, application server 502 coordinates and interacts with service program A 504, service program B 506, service program C 508 and service program D 510 via network 512. Thus, application server 502 can be considered to interact with at least a service program from among a number of service programs. Application server 502 interacts with service program A 504, service program B 506, service program C 508 and service program D 510 in the manner described vis-à-vis FIG. 5.

Initially, application server 502 interacts with at least a service program in software architecture 500 (step 800). A determination is then made whether application server 502 receives or generates an error message that one or more service programs have failed or have experienced an error (step 802). If application server 502 has received no error message, then application server 502 continues execution (step 814). The process terminates thereafter. However, if application server 502 does receive an error message from a service program, then that service program is isolated (step 804).

For example, if application server 502 receives or generates an error message that service program A 504 has failed, then service program A 504 is isolated. Note that application server 502 need not necessarily receive an error message in order to isolate a service program or cause a service program to be isolated. If application server 502 attempts to interact with a service program and fails, the application server 502 can simply isolate the failed service program or cause the failed service program to be isolated.

Next, a determination is made whether isolation of the failed service program affects other service programs, in that the failed service program prevents other service programs from running or running as desired (step 806). If isolation of the failed service program does not affect other service programs, then the process skips to step 810 for further determination. However, if isolation of the failed service program does affect other service programs, then the other affected service programs are isolated (step 808).

For example, service program A 504 fails and is isolated, as described above. In this case, service program B 506 can not run or can not operate as desired because service program A 504 is isolated. In other words, service program B 506 is affected by the isolation of service program A 504. Thus, service program B is also isolated.

Next, a determination is made whether application server 502 can still run (step 810). If application server 502 can still run, then application server 502 continues execution (step 814). The process terminates thereafter. If application server 502 can not still run, the application server 502 ceases execution (step 812). Again, the process terminates thereafter.

Figure 9:
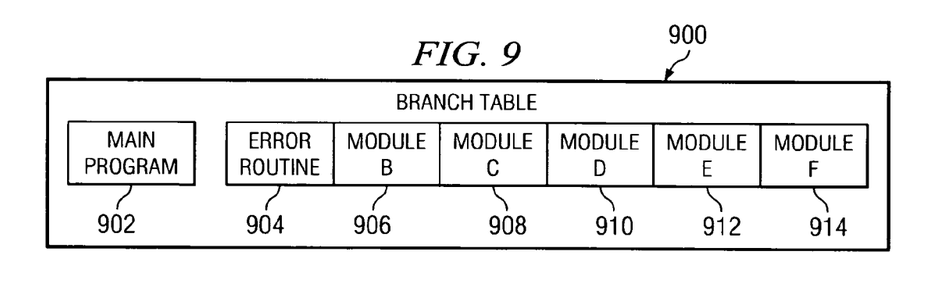
FIG. 9 is a block diagram of a data structure which allows a software component to be isolated from other software components in a software architecture, in accordance with an illustrative example of the present invention.

FIG. 9 is a block diagram of a data structure which allows a software component to be isolated from other software components in a software architecture, in accordance with an illustrative example of the present invention. The data structure shown in FIG. 9 is intended for use with the process shown in FIG. 7 and software architecture 400 shown in FIG. 4. The data structure shown in FIG. 9 can be implemented on a data processing system, such as clients 110, 112, and 114 in FIG. 1; servers 104 and 106 in FIG. 1; and data processing system 200 shown in FIG. 2. The data structure shown in FIG. 9 can be implemented using separate data processing systems communicating via a network, such as network 102 in FIG. 1.

Branch table 900 contains entries for each module and main program in software architecture 400. Thus, branch table 900 contains an entry 902 for main program 402, an entry 906 for program B 406, an entry 908 for program C 408, an entry 910 for program D 410, an entry 912 for program E 412, and an entry 914 for program F 414. Each entry represents data in an array or other database that allows the respective program or main program to be identified. Each entry allows a set of instructions to replace entries in branch table 900 with an error handling routine. Thus, for example, the entry for program A has been replaced with error routine 904.

Branch table 900 is considered a branch table because each program and main program in software architecture 400 is considered a branch in software architecture 400. Branch table 900 can be created by using a creation set of instructions to traverse each entry for programs and modules in software architecture 400 and detect where discrete sets of instructions that form the modules and main programs can be found. The creation set of instructions can then gather data regarding each module and main program and place that data in an array or other database, as shown in branch table 900. To increase the ease of this process, software architecture 400 can be broken-down between a main code path and functional software components or modules for easy isolation and quarantine of errant functions.

In addition, the origin of the error in a set of instructions can be determined through high level stack traces that trace the error back to a function in a particular set of instructions. When the originating set of instructions or module is determined as the source of the error, the module or set of instructions is identified as an "error zone" and is isolated in the manner described herein.

Error routine 904 is a set of instructions that allows main program 402 or some other program, application, or set of instructions to isolate a module that has failed. For example, error routine 904 can insert a set of instructions into software architecture 400 that effectively severs module A 404 from communication or interaction with main program 402 or module D 410. This set of instructions can be a generic error function that replaces the module or set of instructions associated with the error with a generic error value that indicates that the particular code path is no longer valid. In this way, module A 404 is isolated. Error routine 904 can also be programmed to transmit an error message to a user to inform the user of the error and/or the nature of the error. The error message can be further adapted to prompt the user to take specific action to address or limit the error. The error message can be further adapted to convey any desired message to a user.

In addition to isolation, the error routine can direct calls to the module associated with the error to a different module. Thus, software architecture 400 in FIG. 4 can be adjusted to accommodate the error. For example, if module A 404 is isolated, then calls to module A 404 can be redirected to module B 406. Later, module A 404 can be fixed, repaired, updated, or replaced, or the error otherwise resolved. At that time, module A 404 can be restored to full operation within software architecture 400.

Similarly, an error routine can be created and substituted for the branch entry for main program 402. In this case, the error routine will cause main program 402 to cease operation. As a result, the entire operation of all main programs and modules can cease execution. However, in some software architectures, some modules may continue execution even though main program 402 ceases execution.

Figure 10:
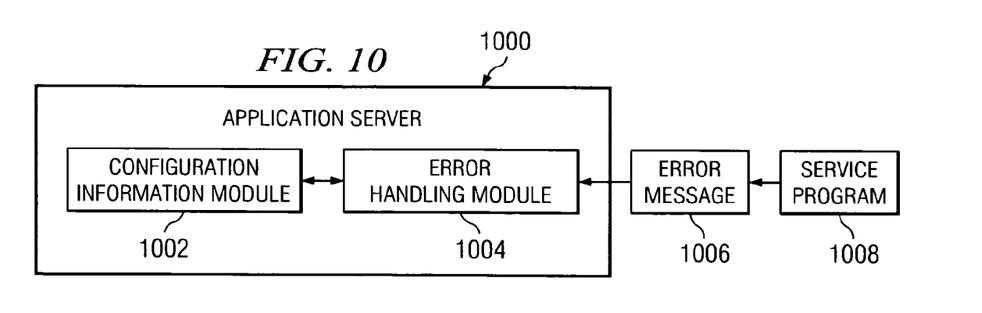
FIG. 10 is a block diagram illustrating how relationships between an application server and a number of service programs can be altered, in accordance with an illustrative example of the present invention.

FIG. 10 is a block diagram illustrating how relationships between an application server and a number of service programs can be altered, in accordance with an illustrative example of the present invention. The block diagram of FIG. 10 is intended for use with the process shown in FIG. 8 and software architecture 500 shown in FIG. 5. The block diagram of FIG. 10 can be implemented on one or more data processing systems, such as clients 110, 112, and 114 in FIG. 1; servers 104 and 106 in FIG. 1; and data processing system 200 shown in FIG. 2. The data structure shown in FIG. 10 can be implemented using separate data processing systems communicating via a network, such as network 102 in FIG. 1.

Application server 1000 can be application server 502 shown in FIG. 5. Similarly service program 1008 can be any service program shown in FIG. 5. Application server 1000 contains, among other programs and data, error handling module 1004 and configuration information module 1002. Configuration information module 1002 contains information related to configurations of service programs with which application server 1000 interacts. Application server 1000 contains other modules to allow application server 1000 to interact with and coordinate a number of service programs. Examples of application server modules can be found in WEBSPHERE APPLICATION SERVER®, which is provided by International Business Machines Corporation of Armonk, N.Y.

As shown in FIG. 10, service program 1008 sends an error message 1006 to error handling module 1004. In turn, error handling module 1004 communicates with configuration information module 1002 to communicate the fact that error message 1006 has been received. In response, configuration information module 1002 takes action to configure application server 1000, or cause application server 1000 to be configured, such that application server isolates service program 1008.

In addition, application server 1000 can send a request to update an appropriate registry to point to a temporary error replacement service. The temporary error replacement service handles returning the error value and possibly provides error messages to users, as described below. For example, if service program A 504 fails, then application server 502 can direct calls to service program A 504 to another service program, such as service program C 508 or service program D 510, or to some other service program not shown.

In another illustrative example, error message 1006 need not be generated by service program 1008. Instead, error message 1006 can be generated by error handling module 1004 when some other module or aspect of application server 1000 fails to interact as desired with service program 1008. This internally generated error message is then communicated to configuration information module 1002, as described above. As a result, application server 1000 takes action to isolate service program 1008.

The block diagram of FIG. 10 shows one service program interacting with one application server having one error handling module and one configuration module. However, application server 1000 can interact with multiple service programs in the manner shown in order to isolate multiple service programs, when desired. Similarly, error message 1006 can be conveyed to multiple error handling modules within a single application server, or to more, different, or fewer modules than those shown. Likewise, error message 1006 can be conveyed to multiple application servers, each of which interacts with one or more service programs. In addition, a user or network administrator can manually isolate service programs or application servers. If desired, an error message can be returned to any user that attempts to interact with a service application or application server that has been isolated. The error message can convey any information or prompt, such as those described vis-à-vis FIG. 9. Thus, block diagram of FIG. 10 can be expanded to include many different configurations of software architectures, other than software architecture 500 shown in FIG. 5.

The methods and devices described herein have several advantages over known methods for handling errors within software or within a software architecture. For example, an individual program, module, or set of instructions can be isolated from the remainder of the software architecture while still allowing operation of the remainder of the applications, software, programs, modules, or sets of instructions in the software architecture. In the case of many programs, applications, or sets of instructions interacting via a network, the methods and devices described herein allow a main program or application server to continue execution even if one or more sub-components of the software architecture have been subject to a malicious attack. Furthermore, the methods and devices described herein can be expanded to include many different software architectures. Furthermore, the methods and devices described herein can allow isolation of any particular set of instructions within a software architecture whenever desired, whether or not the particular sets of instruction are experiencing an error or some other failure.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, or semiconductor system (or apparatus or device) medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method comprising:
  executing a software application, wherein the software application interacts with a plurality of programs;
  receiving an error message, wherein the error message indicates an error has occurred in a first program within the plurality of programs;
  isolating the first program such that the first program no longer interacts with the software application, wherein isolating the first program is performed by replacing an error handling routine for an entry for the first program in a branch table, and wherein the error handling routine comprises:
  communicating an error message to a configuration information module of an application server, wherein the configuration information module contains information related to configurations of the plurality of programs with which the application server interacts; and
  wherein each of the plurality of programs not isolated continues to interact with the software application and each of the plurality of programs not isolated while the first program is isolated.

2. The computer-implemented method of claim 1 wherein isolating the first program does not affect execution of the other programs in the plurality of programs.

3. The computer-implemented method of claim 1 wherein isolating the first program affects execution of a second program in the plurality of programs and wherein the method further comprises:
  isolating the second program such that the second program no longer interacts with the software application.

4. The computer-implemented method of claim 1 wherein the software application comprises a main program and wherein the plurality of programs comprise a plurality of modules and wherein the first program comprises a first module.

5. The computer-implemented method of claim 1 wherein the software application comprises an application server and wherein the plurality of programs comprise a plurality of service programs and wherein the first program comprises a first service program.

6. A computer program product comprising:
  a computer readable storage medium having computer usable program code for performing a diagnostic in a hardware component established in a data processing system, said computer program product including:
  computer usable program code for executing a software application, wherein the software application interacts with a plurality of programs;
  computer usable program code for receiving an error message, wherein the error message indicates an error has occurred in a first program within the plurality of programs; and
  computer usable program code for isolating the first program such that the first program no longer interacts with the software application, wherein each of the plurality of programs not isolated continues to interact with the software application and each of the plurality of programs not isolated while the first program is isolated, wherein isolating the first program is performed by replacing an error handling routine for an entry for the first program in a branch table, wherein the error handling routine comprises computer usable program code for communicating an error message to a configuration information module of an application server, and wherein the configuration information module contains information related to configurations of the plurality of programs with which the application server interacts.

7. The computer program product of claim 6 wherein isolating the first program does not affect execution of the other programs in the plurality of programs.

8. The computer program product of claim 6 wherein isolating the first program affects execution of a second program in the plurality of programs and wherein the computer program product further comprises:
  computer usable program code for isolating the second program such that the second program no longer interacts with the software application.

9. The computer program product of claim 6 wherein the software application comprises a main program and wherein the plurality of programs comprise a plurality of modules and wherein the first program comprises a first module.

10. The computer program product of claim 6 wherein the software application comprises an application server and wherein the plurality of programs comprise a plurality of service programs and wherein the first program comprises a first service program.

11. A data processing system comprising:
  a processor;
  a bus connected to the processor;
  a hardware component connected to the bus, the hardware component containing a first diagnostic routine;
  a computer usable medium connected to the bus, wherein the computer usable medium contains a set of instructions, wherein the processor is adapted to carry out the set of instructions to:
  execute a software application, wherein the software application interacts with a plurality of programs;
  receive an error message, wherein the error message indicates an error has occurred in a first program within the plurality of programs; and
  isolate the first program such that the first program no longer interacts with the software application, wherein each of the plurality of programs not isolated continues to interact with the software application and each of the plurality of programs not isolated while the first program is isolated, wherein isolating the first program is performed by replacing an error handling routine for an entry for the first program in a branch table, wherein the error handling routine comprises communicating an error message to a configuration information module of an application server, wherein the configuration information module contains information related to configurations of the plurality of programs with which the application server interacts.

12. The data processing system of claim 11 wherein isolating the first program does not affect execution of the other programs in the plurality of programs.

13. The data processing system of claim 11 wherein isolating the first program affects execution of a second program in the plurality of programs and wherein the processor is further adapted to carry out the set of instructions to:
  isolate the second program such that the second program no longer interacts with the software application.

14. The data processing system of claim 11 wherein the software application comprises a main program and wherein the plurality of programs comprise a plurality of modules and wherein the first program comprises a first module.

15. The data processing system of claim 11 wherein the software application comprises an application server and wherein the plurality of programs comprise a plurality of service programs and wherein the first program comprises a first service program.

* * * * *